J. C. CAKE.
PEDAL OPERATING MECHANISM.
APPLICATION FILED JULY 15, 1912.
1,082,846.
Patented Dec. 30, 1913.
2 SHEETS—SHEET 2.
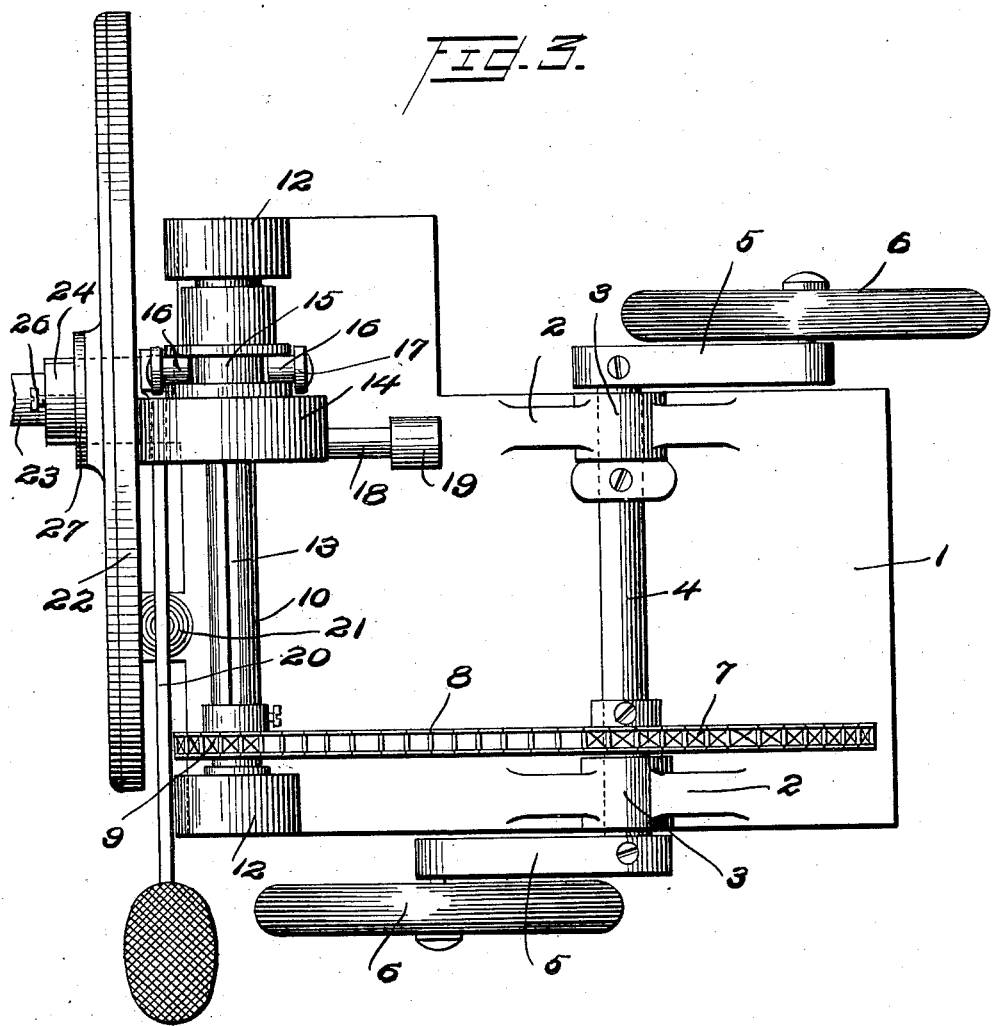
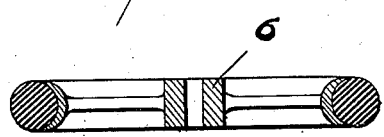
Witnesses
Inventor
John C. Cake
By Joshua R. H. Potts
Attorney

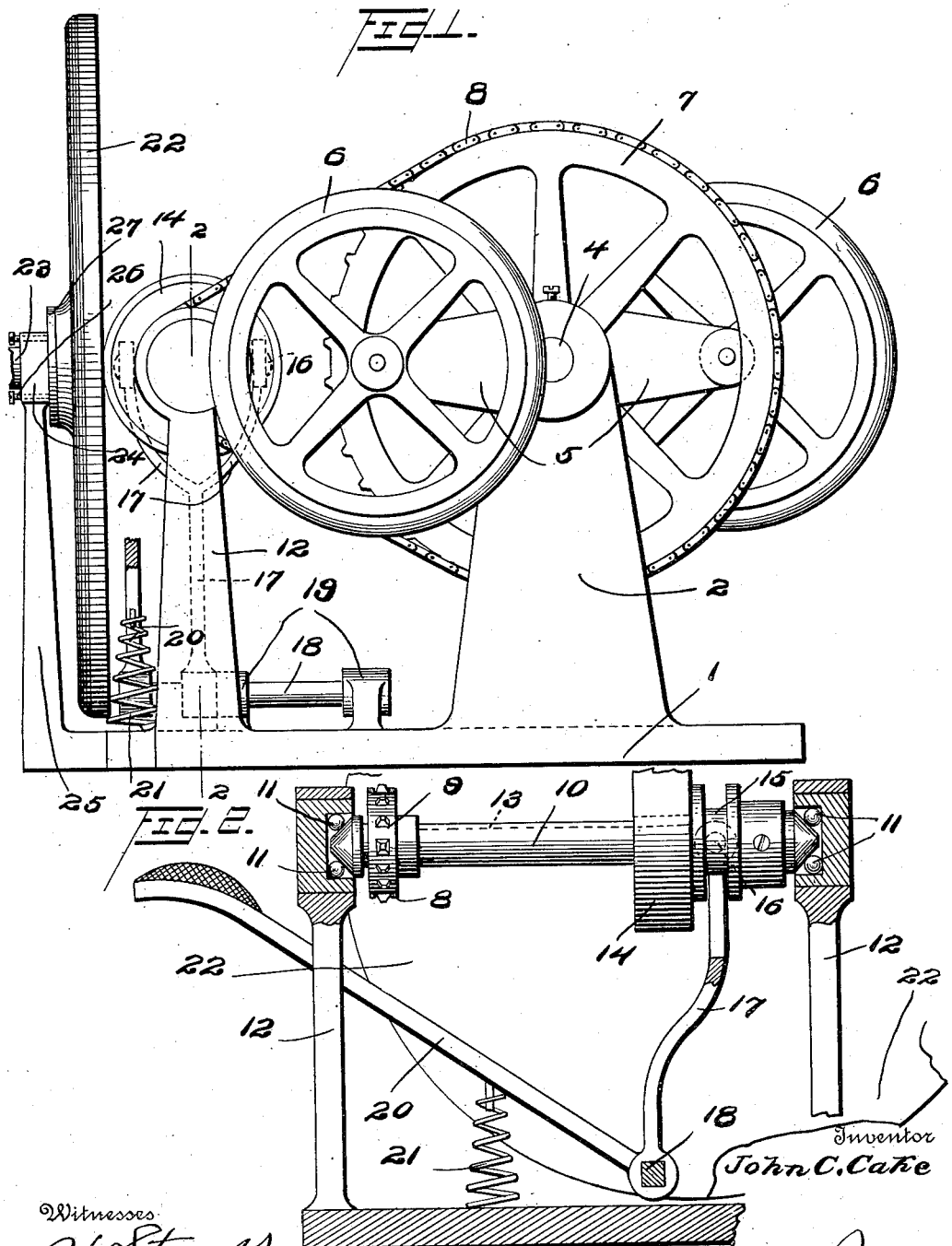

UNITED STATES PATENT OFFICE.

JOHN C. CAKE, OF CHESTER, PENNSYLVANIA.

PEDAL-OPERATING MECHANISM.

1,082,846.

Specification of Letters Patent. Patented Dec. 30, 1913.

Application filed July 15, 1912. Serial No. 709,340.

*To all whom it may concern:*

Be it known that I, JOHN C. CAKE, a citizen of the United States, residing at Chester, in the county of Delaware and State of Pennsylvania, have invented certain new and useful Improvements in Pedal-Operating Mechanism, of which the following is a specification.

My invention relates to improvements in pedal operating mechanism, the object of the invention being to provide improved means for moving pedals particularly the pedals of pneumatic pianos, organs, and like devices, the object of the invention being to provide improved power transmitting means which permit the speed of transmission to be readily controlled at all times.

A further object is to provide an improved foot controlled adjusting means which causes a friction pulley to move across the face of a friction disk and regulate the speed of transmission of the pedal operating devices.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a view in section on the line 2—2 of Fig. 1 with parts omitted for purposes of clearness. Fig. 3 is a plan view of Fig. 1, and Fig. 4 is a view in cross section through one of the pedal engaging wheels.

1 represents a base having brackets 2 thereon provided with bearings 3 at their upper ends in which a shaft 4 is mounted. On this shaft 4 at its ends, crank arms 5 are secured and support rubber tired wheels 6 which are adapted to engage pedals (not shown) or other suitable devices to cause them to move upwardly and downwardly as the crank shaft is revolved. Power is transmitted to a relatively large sprocket wheel 7 secured to shaft 4 by means of an endless chain 8 which is passed around a relatively small sprocket 9 on a shaft 10. This shaft 10 is positioned parallel to shaft 4 and is preferably provided with ball bearings 11 in the upper ends of uprights 12 on base 1. This shaft 10 is provided with a longitudinal groove 13 in which a friction pulley 14 is keyed to slide. This pulley 14 at one side, is provided with a grooved hub 15 into which pins 16 on the ends of a forked arm 17 project. This forked arm 17 is secured upon an angular shaft 18 mounted to turn in brackets 19 on base 1, and to this shaft 18 a foot lever 20 is secured. By depressing this foot lever 20, the forked arm 17 is swung in one direction to slide the friction pulley 14, while a spring 21 returns the parts to normal position. The friction wheel 14 engages the face of a friction disk 22 which is secured on a drive shaft 23 driven by any suitable source of power, and supported in a bearing 24 on the upper end of a bracket 25 fixed to base 1. In this bearing 24, set screws 26 are located and bear against a collar 27 on shaft 23. By adjusting these screws 26, the engagement of the disk 22 with the friction pulley 14 can be regulated to produce the best results.

As seen in Fig. 3, the pulley 14 is located approximately at the center of disk 22, so that little if any motion will be transmitted from the disk to the pulley. As the foot lever 20 is depressed, the arm 17 will compel the pulley to move longitudinally of shaft 10 and radially of disk 22 toward the outer edge of the latter. As the pulley 14 is moved outwardly, the speed of transmission will be increased on account of the increased diameter of the disk in engagement with the pulley. When therefore, the device is in operative position, the speed may be readily controlled by operating the foot lever 20, the downward movement of said lever increasing the speed and the upward movement of the lever through the medium of spring 21, causing the pulley to move inwardly reducing the speed.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A pedal operating mechanism comprising a base, parallel shafts supported transversely above the base, pedal engaging means on one of said shafts, a friction pulley keyed to slide longitudinally on the other of said shafts, said pulley having a grooved hub, a short longitudinally positioned shaft supported on the base at right angles to and below the first-mentioned shafts, a forked arm secured to the short shaft and engaging the grooved hub, a foot lever secured to the short shaft and projecting at one end beyond the base, means for transmitting motion from one of the first-mentioned shafts to the other, and a friction disk against the face of which said pulley engages, substantially as described.

2. A pedal operating mechanism comprising a base, parallel shafts supported transversely above the base, pedal engaging means on one of said shafts, a friction pulley keyed to slide longitudinally on the other of said shafts, said pulley having a grooved hub, a short longitudinally positioned shaft supported on the base at right angles to and below the first-mentioned shafts, a forked arm secured to the short shaft and engaging the grooved hub, a foot lever secured to the short shaft and projecting at one end beyond the base, means for transmitting motion from one of the first-mentioned shafts to the other, a friction disk against the face of which said pulley engages, and a spring located between the base and the lever and normally holding said lever in elevated position and said pulley at a point adjacent the center of the disk, substantially as described.

3. A pedal operating mechanism comprising a base, parallel shafts supported transversely above the base, pedal engaging means on one of said shafts, a friction pulley keyed to slide longitudinally on the other of said shafts, said pulley having a grooved hub, a short longitudinally positioned shaft supported on the base at right angles to and below the first-mentioned shafts, a forked arm secured to the short shaft and engaging the grooved hub, a foot lever secured to the short shaft and projecting at one end beyond the base, means for transmitting motion from one of the first-mentioned shafts to the other, a friction disk against the face of which said pulley engages, a spring located between the base and the lever and normally holding said lever in elevated position and said pulley at a point adjacent the center of the disk, and means for adjusting the friction disk toward the friction pulley, substantially as described.

In testimony whereof I have signed my name to this specification in the presence of two subscribing witnesses.

JOHN C. CAKE.

Witnesses:
S. W. FOSTER,
CHAS. E. POTTS.